(12) United States Patent
Blair et al.

(10) Patent No.: US 6,625,387 B1
(45) Date of Patent: Sep. 23, 2003

(54) GATED SILENCE REMOVAL DURING VIDEO TRICK MODES

(75) Inventors: Ronald Lynn Blair, Carmel, IN (US); Mark Alan Schultz, Carmel, IN (US); Robert Warren Schmidt, Carmel, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 33 days.

(21) Appl. No.: 10/087,183

(22) Filed: Mar. 1, 2002

(51) Int. Cl.[7] ............................................. H04N 5/91
(52) U.S. Cl. ........................................................ 386/68
(58) Field of Search .............................. 386/66, 68, 70, 386/75, 81, 82, 96, 125–126; 704/270, 500; H04N 5/91

(56) References Cited

U.S. PATENT DOCUMENTS

| | | | | |
|---|---|---|---|---|
| 4,376,874 A | * | 3/1983 | Karban et al. ............... 704/215 |
| 5,687,275 A | * | 11/1997 | Lane et al. .................... 386/68 |
| 5,893,062 A | * | 4/1999 | Bhadkamkar et al. ......... 386/66 |
| 6,154,603 A | * | 11/2000 | Willis et al. ................... 386/68 |
| 6,353,703 B1 | * | 3/2002 | Tatsumi et al. .............. 386/104 |
| 6,356,211 B1 | * | 3/2002 | Shimoyoshi et al. ........ 704/500 |

* cited by examiner

*Primary Examiner*—Vincent Boccio
(74) *Attorney, Agent, or Firm*—Joseph S. Tripoli; Harvey D. Fried; Francis A. Davenport

(57) ABSTRACT

The invention concerns a method and apparatus for playing an audio track during a faster than 1× speed video trick mode playback of a video presentation. The method begins with the step of retrieving from a storage medium information for producing at least a video portion and a corresponding audio portion of a presentation. The audio portion of the presentation, like most audio sound tracks, includes periods of relative silence. For example, these may occur between words or between dramatic pauses in the dialogue. Audio gating is used to selectively gate the audio portion of the presentation to remove at least a portion of the periods of relative silence. Finally, a remaining part of the audio portion of the presentation is concatenated for playback to remove any gaps after the portion of the periods of relative silence have been removed.

14 Claims, 3 Drawing Sheets

GATED SILENCE REMOVAL DURING VIDEO TRICK MODES

BACKGROUND OF THE INVENTION

1. Technical Field

The invention concerns improved trick mode playback, and more particularly to improvements in the trick mode playback of audio soundtrack associated with a video segment played back at a faster than normal speed.

2. Description of the Related Art

DVD trick modes can include speedup or slowdown of normal playback to either search for a specific location on the disc or to look at details of a particular scene that would be missed at normal speed. By convention, normal playback speed can be denoted as 1×. Both audio and video trick modes are possible and both can be found on commercially available DVD players. However, conventional methods for playback of audio at fast or slow speed have proved to be problematic. The advancement of digital signal processors and especially audio digital signal processors that are used in currently available products have created the possibility for more sophisticated real-time processing for improved audio trick modes.

One problem with the use of video trick modes concerns the treatment of audio corresponding to a trick playback video segment. For example, when a user speeds up or slows down a program video segment, the corresponding audio segment that is played back can be distorted. Typically, audio samples in the audio segment can be shifted to higher frequencies during a fast trick mode, and to lower frequencies during a slow trick mode. The fast trick modes that increase the playback speed by a factor of between about 1.5 to 3 times as compared to normal playback will tend to cause human speech to sound higher in pitch. This higher pitched audio playback, the chipmunk effect, can be annoying and in many instances may be unintelligible to a listener. Conversely, slow frequency trick modes can produce a low frequency wobble that may be understandable but not aurally pleasing.

In order to obtain the most useful audio playback during video trick modes as described herein, it is also necessary to consider the nature of the particular trick mode. For example, while it may be possible to utilize various techniques to provide intelligible audio for 1.5× or 2× trick modes, such techniques may provide unsatisfactory results when the trick mode involves playback at 5× or 10×. At such high rate playback speeds, any attempt to play back audio content in synchronism with the video may result in unintelligible speech due to the very rapid rate at which words would need to be presented.

To avoid the various types of audio artifacts resulting from DVD trick modes, conventional DVD players will often mute the audio during trick modes. However, this is not an entirely satisfactory solution as the audio may be of interest in such modes. Accordingly, it would be advantageous if a DVD player could playback audio in a manner that overcomes the limitations of the prior art and achieve a desirable and aurally pleasant playback of audio during video trick modes.

SUMMARY OF THE INVENTION

The invention concerns a method and apparatus for playing audio programming during a faster than 1× speed video trick mode playback of a video presentation. The method begins with the step of retrieving from a storage medium information for producing at least a video portion and a corresponding audio portion of a presentation. The audio portion of the presentation, like most audio sound tracks, includes periods of relative silence. For example, these may occur between words or between dramatic pauses in the dialogue. Audio gating is used to selectively gate the audio portion of the presentation to remove at least a portion of the periods of relative silence. Finally, a remaining part of the audio portion of the presentation is concatenated for playback to remove any gaps after the portion of the periods of relative silence have been removed.

The removing step can include selectively removing a percentage portion of the periods of relative silence based on a selected video trick mode playback speed. According to one aspect of the invention, the removing step can further include determining an optimized percentage portion of each period of silence that must be removed in order to synchronize the audio portion and the video portion for playback after the concatenating step. The removing step can also include increasing the percentage portion of the periods of silence that are removed in order to achieve a faster video trick mode playback speed.

The gating step can further include selectively setting a gating threshold based on a selected video trick mode playback speed. An optimized gating threshold can be selected that is necessary to synchronize the audio portion and the video portion for playback after the concatenating step. In general, increasing the gating threshold will facilitate audio playback during a faster video trick mode speed.

The invention also concerns an apparatus for playing an audio track during a faster than 1× speed video trick mode playback of a video presentation. The apparatus can include a storage medium reader for retrieving from a particular storage medium the information for producing at least a video portion and a corresponding audio portion of a presentation. As noted above, the audio portion of the presentation typically will comprise periods of relative silence. An audio gate is provided for selectively gating the audio portion of the presentation to remove at least a portion of the periods of relative silence. The output of the audio gate can be communicated to an audio processor for concatenation after the periods of relative silence have been removed.

The invention can further include a processor for selectively determining a percentage portion of the periods of relative silence to be removed based on a selected video trick mode playback speed. According to one aspect of the invention, the processor can determine an optimized percentage portion necessary to synchronize the audio portion and the video portion for playback after concatenation. In general, the processor will selectively increase the percentage portion of the periods of silence for removal for a faster video trick mode playback speed.

The processor can also selectively set a gating threshold based on a selected video trick mode playback speed. According to one embodiment, the processor selectively determines an optimized gating threshold necessary to synchronize the audio portion and the video portion for playback after the concatenating step. In general, the processor will selectively increase the gating threshold for a faster video trick mode playback speed.

DETAILED DESCRIPTION

The present invention can be used for performing normal playback of audio during video trick modes in any type of digital video recorded on any suitable storage medium. For convenience, the invention shall be described in the context of a DVD medium utilizing conventional MPEG-1 or MPEG-2 formats. However, those skilled in the art will appreciate that the invention is not limited in this regard. The data storage medium can include any media that is capable of storing substantial amounts of audio and video data for retrieval and playback at a subsequent time. As used herein, a storage medium can include, but is not limited to, optical, magnetic and electronic means for storing data. Exemplary digital storage media can include an optical digital versatile disk (DVD), a magnetic hard disk, magneto-optical disk, a video CD or regular CD, or solid-state memory such as dynamic random access memory (DRAM) or synchronous DRAM (SDRAM).

Figure 1:
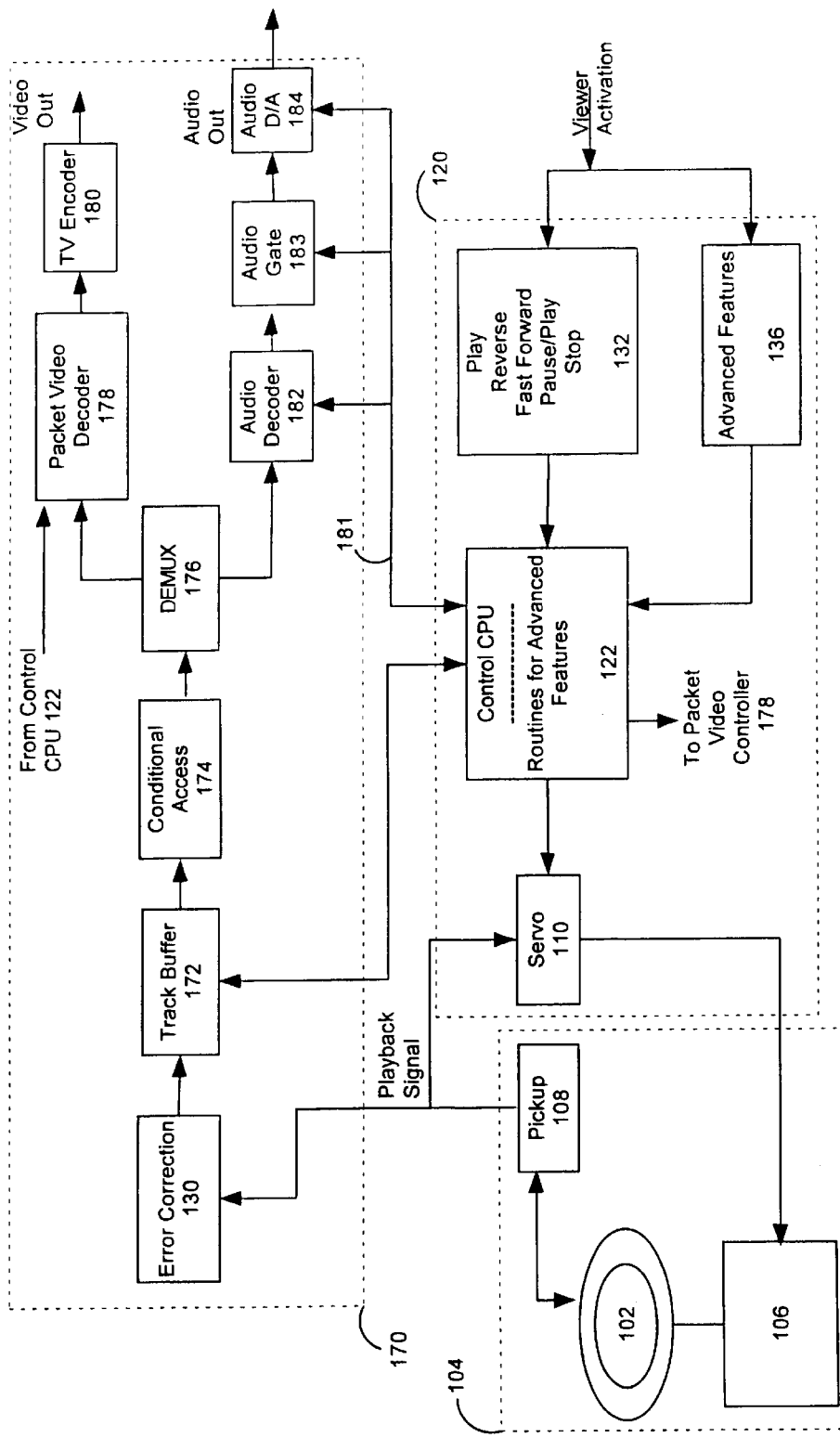
FIG. 1 is a block diagram of a DVD device that can be provided with one or more advanced operating functions in accordance with the inventive arrangements.

FIG. 1 is a block diagram of an exemplary DVD video player in which the present invention may be implemented. The device 100 can have the capability to read stored data from a digital storage medium. Referring to FIG. 1, the storage medium can be a re-writable disk 102, for example a DVD type. Device 100 can include a mechanical assembly 104, a control section 120, and a audio/video (A/V) output processing section 170. The allocation of most of the blocks to different sections is self-evident, whereas the allocation of some of the blocks is made for purposes of convenience and is not critical to understanding the operation of the device 100. Importantly, it should be recognized that if the data storage medium were a solid-state device, the mechanical assembly 104 would not be necessary to practice the invention. In this case, the coded digital data stored in the storage medium can be directly accessed by control CPU 122 and buffered in track buffer 172.

Notwithstanding, the mechanical assembly 104 can include a motor 106 for spinning the DVD disk 102 and a pickup assembly 108 adapted to be moved over the spinning disk 102. A laser forming part of pickup assembly 108 can illuminate data already stored on the disk track for playing back video and/or audio program data. For purposes of understanding the invention, it is irrelevant whether the disc is recordable. The laser mounted on the pickup assembly 108 and the motor 106 can be controlled by a servo 110. The servo 110 can also be configured to receive a input playback signal representing data read from spiral tracks on disk 102. The playback signal can also serve as an input to an error correction circuit 130, which can be considered part of the control section 120 or part of the A/V output processing section 170.

The control section 120 can include a control central processing unit (CPU) 122. The servo 110 can also be considered part of the control section 120. Suitable software or firmware can be provided in a memory for the conventional operations performed by control CPU 122. In addition, program routines for the advanced features as described herein can be provided for controlling CPU 122.

A control buffer 132 for viewer activatable functions can be configured to indicate those functions presently available, namely play, reverse, fast forward, slow play, pause/play and stop. The pause function is analogous to pause operation typically found on most videocassette recorders (VCRs). The pause function can have the capability to manually interrupt the play back of a prerecorded presentation in order to eliminate undesired segments such as commercials, from a recording. Advanced features buffer 136 can be provided for implementing other advanced playback functions, including control of trick modes as described herein. Playback trick modes can include forward and reverse playback at speeds other than standard 1× playback speed.

The output processing section 170 can include an error correction block 130 and a track buffer or output buffer 172, in which data read from the disc can be buffered and assembled into packets for further processing. The packets can be processed by conditional access circuit 174 that controls propagation of the packets through demultiplexer 176 and into respective paths for video and audio processing. The video can be decoded by decoder 178, for example from MPEG-1 or MPEG-2 formats, and encoded to form a conventional television signal format such as ATSC, NTSC, SECAM or PAL. The audio data stream can be decoded by decoder 182, for example from MPEG-1 or MPEG-2 formats, and converted to analog form by audio digital-to-analog (D/A) converter 184. The audio D/A 184 can process digital audio received from the audio decoder 182 and produce an analog output signal.

Audio decoder 182 preferably includes a buffer for temporarily storing audio data prior to decoding. The operation of audio decoder 182 can be controlled via system bus 181 by a processor such as control CPU 122. Digital audio from audio decoder 182 can be converted to analog form by a suitable digital to analog conversion device such as audio D/A 184.

Finally, the system also preferably includes an audio gate for removing at least a portion of any periods of relative silence that may be contained in the audio information output by audio decoder 182 and concatenating the remaining portions of the audio signal as shall hereinafter be disclosed. If the audio gating process is to be performed in the digital domain, then audio gate 183 of the digital variety is preferably provided as shown in FIG. 1 for processing digital audio output from audio decoder 182. However, the invention is not limited in this regard and audio gating can also be performed in the analog domain. In that case, an analog type audio gate can be used and the input to the audio gate preferably would be the analog signal output from audio D/A 184.

Further, the audio gate and concatenation processing as shall hereinafter be described can also be performed by control CPU 122. Communications between the audio decoder 182 and audio D/A 184 can be provided by a suitable system communication link such as system bus 181. System bus 181 can also be used to control the various operating parameters of audio decoder 182, digital audio gate 183, and audio D/A 184. For convenience, the invention shall be described relative to the architecture in FIG. 1.

Figure 2:
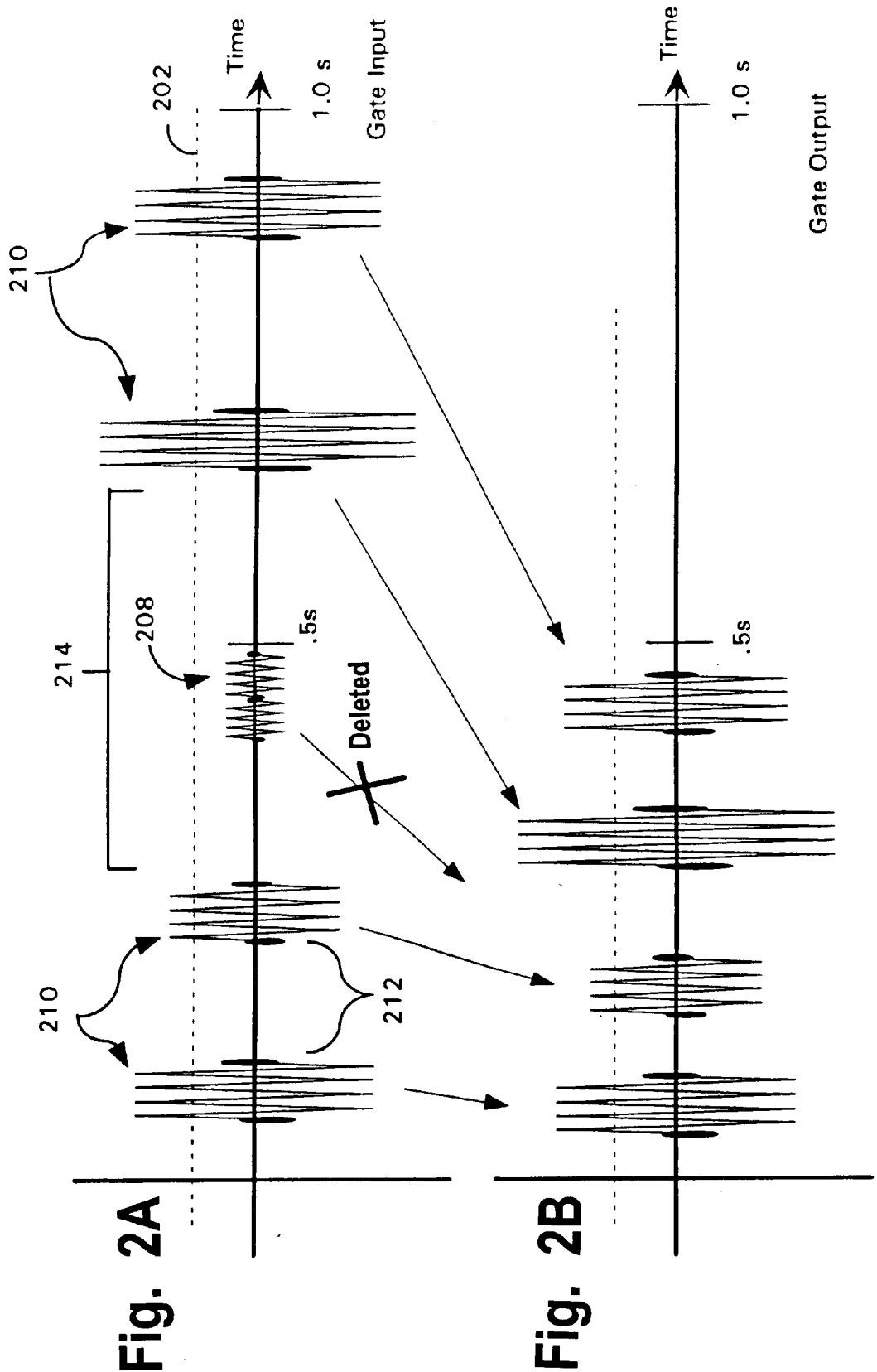
FIGS. 2A and 2B are audio signal time lines useful for understanding the inventive arrangements as implemented in an exemplary media player such as device 100 of FIG. 1.

Regardless of the specific architecture chosen, the audio gating system is preferably configured to perform two distinct functions as illustrated in FIGS. 2A and 2B. One function is to remove from the audio signal at least a portion of those periods of relative silence 212, 214 occurring between audio peaks levels. As used herein, the term relative silence refers to periods where audio levels are below a selected audio level threshold 202. Most commonly, such periods of relative silence will occur between spoken words or dialogue associated with a video presentation. The term relative silence is used herein in recognition of the fact that a certain amount of low level audio 208, often termed audio atmosphere is generally present as an acoustic background during programming, becoming apparent between spoken words or during other relatively quiet portions of the audio presentation. These periods 214 where the audio is at low levels are also referred to herein as periods of relative silence. The threshold level 202 determines the level of audio that will be considered relative silence for the purposes of the invention. For example, in a digital system implementation, determination of periods of relative silence is achieved by a function such as a digital comparator which compares the digital audio words against a digital threshold value formed by control CPU 122. In operation digital audio words are flagged as high, if greater than the threshold value, or conversely, low if less than the threshold, with only words flagged as high being processed to form trick play audio output signals. The digital words that exceed the threshold value are flagged as high and concatenated or essentially caused to be abutted or effectively joined together in order for the relative silence gaps to be substantially eliminated thereby reducing the duration of the audio content. Concatenation of the high flagged words can be achieved by controlled memory addressing of a memory containing all or part of the digital audio decoded from the MPEG stream, such that only high flagged words are read from the memory and coupled for digital to analog conversion by D/A 184.

In detecting periods of relative silence, wanted audio content containing low level intervals may be inadvertently flagged low to indicate no audio read out, however, such deletion of audio signal content can produce undesirable acoustic effects. To avoid such undesirable trick play audio distortion, digital audio words not exceeding the threshold are flagged low and the number of low flags counted or summed to establish a time dependency or temporal threshold. In this way low level audio passages are not suppressed or inhibited unless the low level is sustained for a predetermined time period. For example, in a 48 KHz sampled digital audio system an exemplary 20 Hz frequency audio signal contains low amplitude components that are deemed to be periods of relative silence and therefore flagged low. Thus, to obviate undesirable audio distortion mentioned previously, the low flags must be continuously present for about the period of the 20 Hz signal, or about 5 milli seconds. Thus, in 5 milli second interval and with a sampling rate of 48 KHz, about 2400 low flags will be required to occur before this 5 milli second temporal threshold is exceeded, continuing low flagged digital audio samples are then identified for deletion from the trick play audio signal.

The determination of relative silence can be performed by either hard wired logic or by use of a software based routine. The audio gate 183 can be configured by control CPU 122 so that the threshold level 202, and or temporal threshold for gating or deleting periods of relative silence may be selected to allow more or less audio past the gate. In other words, the audio level threshold setting 202, and or temporal threshold for allowing audio signals to form audio outputs may be selectively controlled.

FIGS. 2A and 2B show analog audio signal time lines, where FIG. 2A depicts one second of audio signal replay occurring during play speed (1×) reproduction. FIGS. 2A and 2B depict analog audio signals in order to explain the inventive result of gating and concatenation, which can be performed with either analog or digital processing arrangements. FIG. 2B represents the same audio signal segment as shown in FIG. 2A, but replayed at 2× speed and inventively processed to yield the audio signal as depicted. In FIG. 2B the of duration of the audio content is substantially the same as that replayed at 1×, hence the pitch of the audio content is substantially as that reproduced at 1× speed. However, the duration of the complete segment is reduced to one half second. In FIG. 2A, background audio signal 208 is removed by the gating process and is thus absent from FIG. 2B. Further, at least a portion of the periods of relative silence occurring between audio signal 210 in FIG. 2A can be selectively removed as shown in FIG. 2B to speed up the audio sound track. In FIG. 2B, approximately 1.0 second of audio signal applied at the gate input has been modified to have a duration of approximately 0.5 second at the gate output. Thus, the relative audio speed has been increased from 1× to about 2× by removing a portion of those periods of relative silence 212, 214 occurring between audio 210. This modified audio signal can be played back in approximate synchronization, or at substantially the same rate as the video content delivered in a 2× video trick mode. For different video trick mode speeds, the audio playback speed can be adjusted accordingly to approximately match the video playback speed selected by the user.

The audio gate 183 or some other associated audio processing element such as control CPU 122 can be configured to concatenate remaining portions of the audio sound-track after the selected periods of relative silence have been removed. The resulting signal is shown as the gate output in FIG. 2B. The desired effect is to reduce or eliminate at least a portion of the periods of silence between words or other relevant portions of the audio presentation to speed up the overall audio presentation. By controlling the audio signal gate threshold level 202 and the temporal threshold or percentage portion of the periods of silence 212, 214 that are deleted by the gate, the control CPU 122 can determine the relative speed of audio playback. Removing 100% of each period of relative silence will provide maximum increase in audio playback speed.

In the preceding description of concatenation, all high flagged words were read and processed to form output signals with all low flagged words not read from the memory. In this way 100% of each period of relative silence was removed achieving a maximized audio speed up. However, removing a smaller portion of each period of relative silence, for example as depicted between audio 210 will produce a lesser increase in audio playback speed. Removal or deletion of smaller portions of each detected period of relative silence can be achieved by modifying the controlled memory read addresses in accordance with a duration or number of digital words, flagged low to signify periods of relative silence. As described previously for an exemplary 48 KHz sampled digital audio system, a 5 milli second temporal threshold can be produced by counting about 2400 consecutive low flags. Longer temporal threshold periods can be produced by summing greater numbers of low flags. For example one second period of relative silence will contain 48 thousand low flags. In this way, once a minimum temporal threshold is exceeded, initiation of the deletion of periods of relative silence can be controllably determined by varying the low flag count. These measured or quantified audio gaps may then be applied or factored to provide a lesser degree of speed up than that obtained with 100% elimination of the periods of relative silence.

If the audio playback speed cannot be increased sufficiently by removing 100% of the periods of relative silence defined between audio 210, the audio gate threshold level 202 can be increased so as to increase the number and/or length of the portions of the audio signal that is selectively removed by the audio gate 183. Notably, this speed-up can occur without any change in playback audio pitch. However, the invention is not limited in this regard and in some cases it may be desirable to combine the features of the invention with other audio speed-up techniques that will alter the audio pitch.

Figure 3:
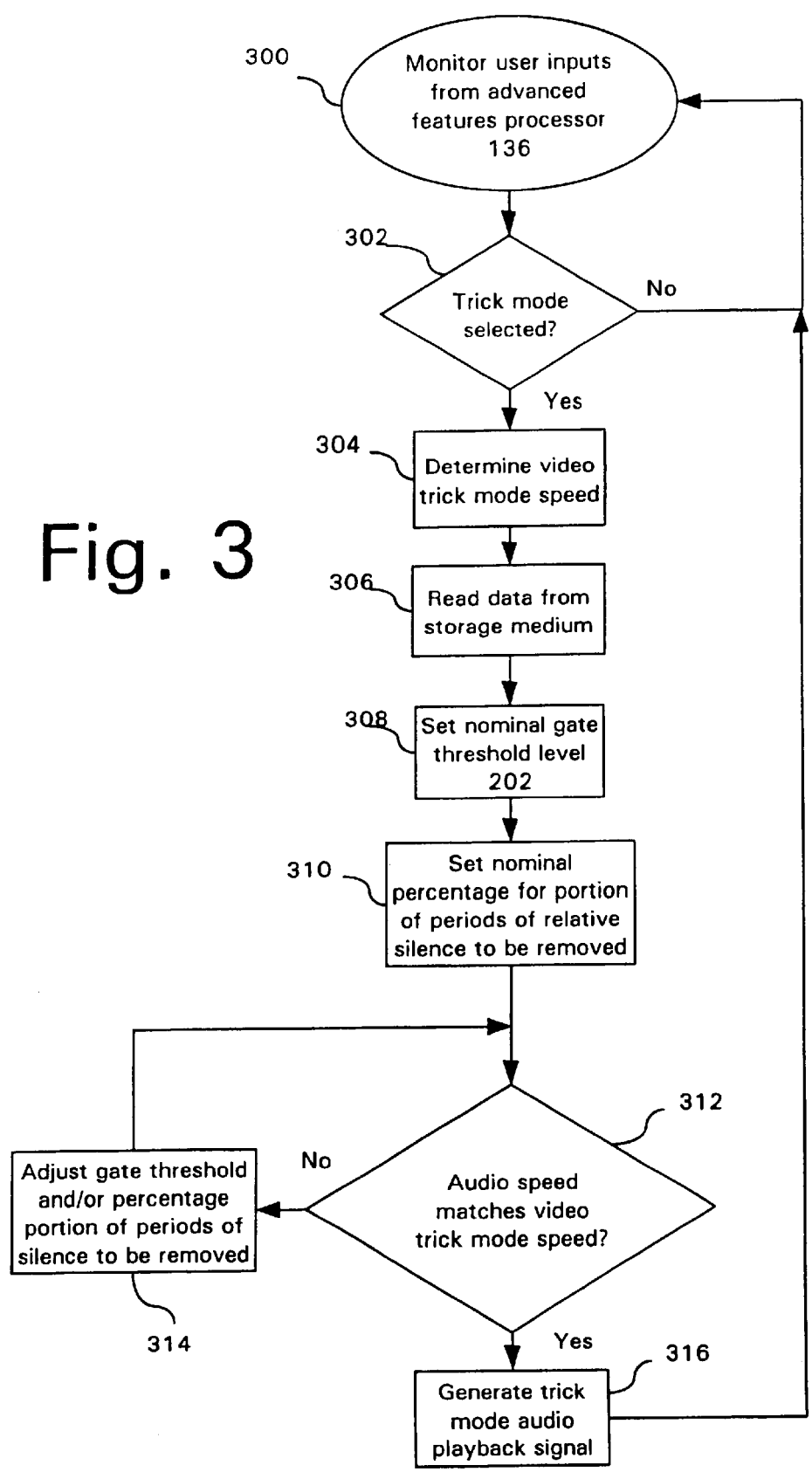
FIG. 3 is an exemplary block diagram that is useful for understanding the gated removal of silence in accordance with the inventive arrangements.

FIG. 3 is a flowchart that is useful for understanding the inventive arrangements as implemented in an exemplary media player such as device 100. The process illustrated in FIG. 3 is described relative to a fast forward playback since audio playback in reverse trick modes is generally not desirable. It should be understood however, that the invention is not so limited. The inventive arrangements as described herein could be applied to reverse playback trick modes using techniques similar to those described in FIG. 3.

Referring to FIG. 3, the process can begin at step 300 when device 100 is operated in a playback mode. In step 300, control CPU 122 can monitor for user inputs from advanced features buffer 136. In step 302, the control CPU 122 can determine whether the trick mode, for example fast forward playback speed, has been selected. If the trick mode is not selected in step 302, the control CPU 122 returns to processing at step 300 and device 100 continues to read coded digital data from the DVD storage medium 102. In a case where the trick mode is selected, the control CPU 122 can continue to steps 304 through 316 for trick mode playback.

In step 304, the control CPU 122 can determine the video trick mode playback speed selected by the user. In step 306, the control CPU 122 can read the next set of data from the storage medium. Based on the video trick mode speed determined in step 304, the control CPU 122 can determine a value for the nominal gate threshold level 202 and a nominal percentage portions of each period of relative silence to be removed.

In step 312, the control CPU 122 can determine whether the audio speed obtained using the selected gate threshold and selected percentage portion of periods of silence to be removed, is sufficient to substantially match the user selected video trick mode speed, i.e. the processed audio delivery rate is substantially that of the video playback thus ensuring a degree of audio to video coincidence. If the average audio delivery rate fails to match the video replay content, the system can adjust the gate threshold and percentage values in step 314. The process can iterate in this way until a satisfactory audio to video match is obtained between the processed audio playback speed and the video trick mode speed selected. Finally, in step 316 the player 100 generates the trick mode audio playback signal in audio A/D 184 and the audio signal is played back substantially in synchronism with the video trick mode programming.

What is claimed is:

1. A method for playing an audio programming during a faster than 1× speed video trick mode playback of a video presentation, the method comprising:

retrieving from a storage medium information for producing at least a video portion and a corresponding audio portion of a presentation, said audio portion of said presentation having periods of relative silence; and, selectively gating said audio portion of said presentation to remove at least a portion of said periods of relative silence; and, concatenating a remainder of said audio portion of said presentation for playback after said portion of said periods of relative silence have been removed.

2. The method according to claim 1, wherein said removing step further comprises selectively removing a percentage portion of said periods of relative silence based on a selected video trick mode playback speed.

3. The method according to claim 2, wherein said removing step further comprises determining an optimized percentage portion necessary to synchronize said audio portion and said video portion for playback after said concatenating step.

4. The method according to claim 2, wherein said removing step further comprises increasing said percentage portion for a faster video trick mode playback speed.

5. The method according to claim 1, wherein said gating step further comprises selectively setting a gating threshold based on a selected video trick mode playback speed.

6. The method according to claim 5, wherein said gating step further comprises determining an optimized gating threshold necessary to synchronize said audio portion and said video portion for playback after said concatenating step.

7. The method according to claim 5, wherein said gating step further comprises increasing said gating threshold for a faster video trick mode playback speed.

8. Apparatus for playing an audio track during a faster than 1× speed video trick mode playback of a video presentation, the method comprising:

a storage medium reader for retrieving from a storage medium information for producing at least a video portion and a corresponding audio portion of a presentation, said audio portion of said presentation comprising periods of relative silence;

an audio gate for selectively gating said audio portion of said presentation to remove at least a portion of said periods of relative silence; and, an audio processor for concatenating a remainder of said audio portion of said presentation for playback after said portion of said periods of relative silence have been removed.

9. The apparatus according to claim 8, further comprising processing means, said processing means selectively determining a percentage portion of said periods of relative silence to be removed based on a selected video trick mode playback speed.

10. The apparatus according to claim 9, wherein said processing means determines an optimized percentage portion necessary to synchronize said audio portion and said video portion for playback after concatenation.

11. The apparatus according to claim 9, wherein said processing means selectively increases said percentage portion for a faster video trick mode playback speed.

12. The apparatus according to claim 8, further comprising processing means for selectively setting a gating threshold based on a selected video trick mode playback speed.

13. The apparatus according to claim 12, wherein said processing means selectively determines an optimized gating threshold necessary to synchronize said audio portion and said video portion for playback after said concatenating step.

14. The apparatus according to claim 12, wherein said processing means selectively increases said gating threshold for a faster video trick mode playback speed.

* * * * *